United States Patent [19]

Braun et al.

[11] 4,401,861
[45] Aug. 30, 1983

[54] SEMICONDUCTOR CROSSPOINT LINEARIZING ARRANGEMENT

[75] Inventors: Arthur R. Braun, Englewood, Colo.; Robert E. Poignant, Oswego, Ill.

[73] Assignee: Bell Telephone Laboratories, Incorporated, Murray Hill, N.J.

[21] Appl. No.: 291,277

[22] Filed: Aug. 10, 1981

[51] Int. Cl.³ ............................................. H04B 3/46
[52] U.S. Cl. ............................ 179/175.3 R; 307/565
[58] Field of Search ................. 179/175.3 R, 175.21, 179/78; 307/565, 567, 363, 362, 317; 370/13, 14

[56] References Cited

U.S. PATENT DOCUMENTS

| | | | |
|---|---|---|---|
| 4,061,884 | 12/1977 | Adrian | 179/18 |
| 4,076,971 | 2/1978 | Mukaemachi et al. | 179/175.3 R |
| 4,280,217 | 7/1981 | Hafer et al. | 370/63 |

Primary Examiner—Stafford D. Schreyer
Attorney, Agent, or Firm—K. H. Samples; R. T. Watland

[57] ABSTRACT

An arrangement for performing subscriber loop testing through a concentrator/expandor employing semiconductor crosspoints. The crosspoints of the concentrator/expandor are relatively nonlinear when conducting currents less than a predetermined current and are relatively linear when conducting currents in excess of the predetermined current. When tests are to be applied to a given subscriber loop which comprises a tip conductor and a ring conductor, two paths are completed through the concentrator/expandor to the tip conductor and two paths are completed through the concentrator/expandor to the ring conductor. A linearizing source then transmits a current in excess of the predetermined current around the circuits formed by the two concentrator/expandor paths to each subscriber loop conductor. Test signals are then applied to the subscriber loop by connecting such signals between the two paths to the subscriber ring conductor and the two paths to the subscriber tip conductor.

13 Claims, 5 Drawing Figures

SEMICONDUCTOR CROSSPOINT LINEARIZING ARRANGEMENT

TECHNICAL FIELD

The present invention relates to switching networks comprising semiconductor crosspoints, and, more particularly, arrangements for signaling through switching networks which employ semiconductor crosspoints having nonlinear conduction characteristics.

BACKGROUND OF THE INVENTION

Telephone switching centers generally include switching networks which comprise a number of input and output terminals and a number of crosspoints. The individual crosspoints are selectively controlled to complete communication paths between the input and output terminals of the network. Historically, network crosspoints have comprised metallic contacts which provide a very linear, low resistance communication path. With advances in semiconductor technology, semiconductor devices are being used in place of the metallic crosspoints. The use of such semiconductor devices tends to increase the speed of network operation and to reduce the size. Typical semiconductor crosspoints, however, exhibit higher resistance and increased nonlinearity when compared to their metallic predecessors. This is particularly true for semiconductor crosspoints such as thyristors and gated diode switches which are used in networks capable of handling large voltages and/or currents.

When relatively low voltage signals are applied to a network comprising crosspoints having nonlinear conduction characteristics, severe distortion of such signals can take place. This occurs primarily because such crosspoints are generally at their most nonlinear at voltages near zero. Such distortion becomes a particular problem when low voltage tests are being applied through a semiconductor network, since any distortion of the signals can greatly change test results. Additionally, when a circuit such as a telephone subscriber loop is being tested, no modifications can be made to the loop circuit in an attempt to linearize the network without also distorting the test results. An arrangement in accordance with the present invention permits the transmission and reception of low level signals through a switching network comprising nonlinear semiconductor crosspoints with little or no distortion of such signals.

SUMMARY OF THE INVENTION

A switching arrangement in accordance with the present invention comprises a switching network having a plurality of input and output ports; a plurality of crosspoints, each of the crosspoints having relatively nonlinear conduction characteristics when conducting a current less than a predetermined current and having relatively linear conduction characteristics when conducting a current in excess of the predetermined current; a controller for controlling the crosspoints of the switching network to establish separate conduction paths between one of the input ports and two selected ones of the output ports; and a bias arrangement connected to the selected output ports for transmitting a current in excess of the predetermined current from one of the selected output ports to the other of the selected output ports.

BRIEF DESCRIPTION OF THE DRAWING

A more complete understanding of the invention may be obtained from a consideration of the following description when read in conjunction with the drawing in which.

DETAILED DESCRIPTION

Figure 1:
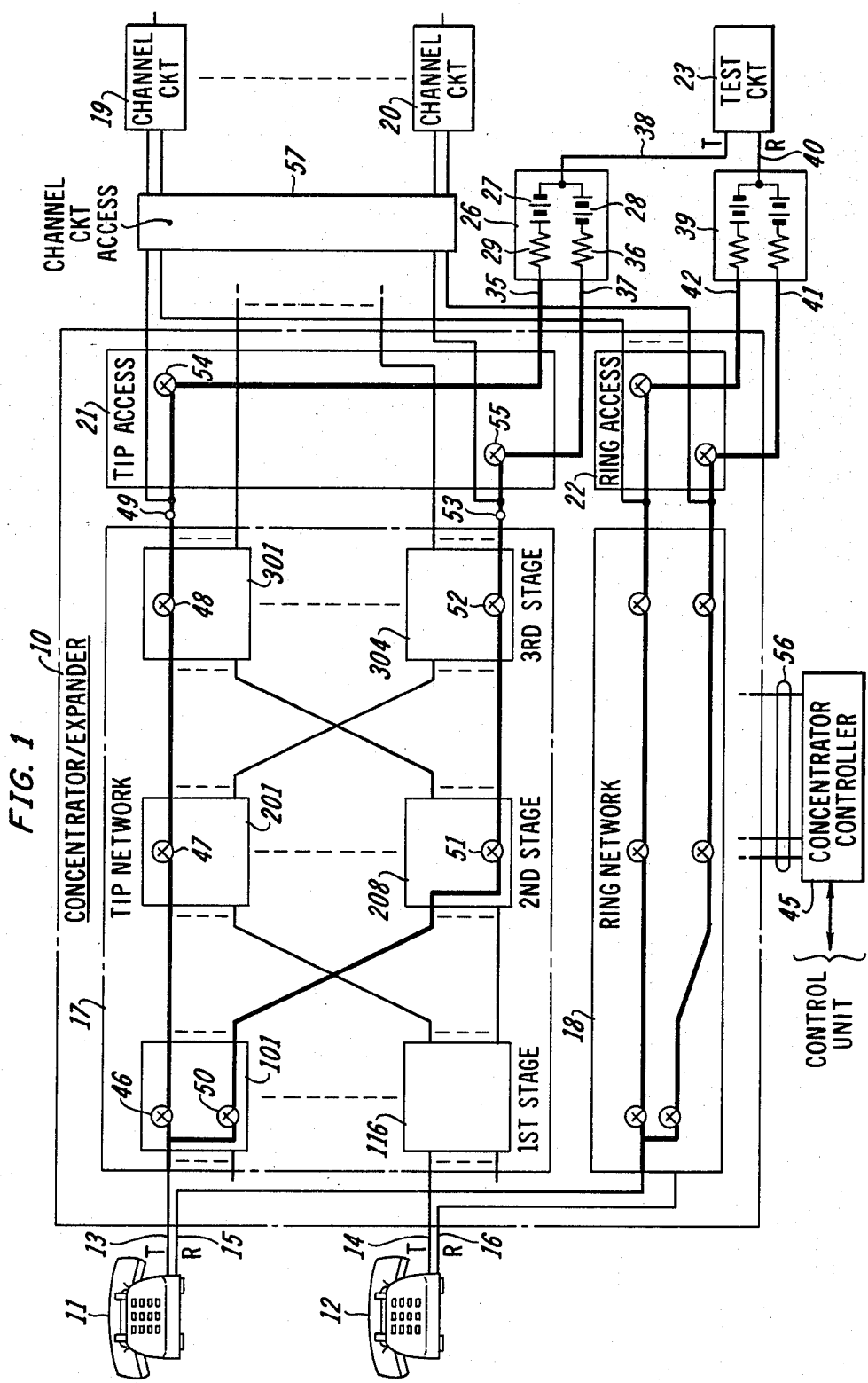
FIG. 1 is a block diagram of a portion of a telephone concentrator arrangement embodying the present invention.

FIG. 1 is a block diagram of a portion of a telephone concentrator/expandor arrangement embodying the present invention for testing subscriber loops. This concentrator arrangement may be used in time division switching systems such as, that disclosed in E. H. Hafer et al., U.S. Pat. No. 4,280,217. The present embodiment includes a concentrator/expandor 10 to which up to 512 subscriber sets such as subscriber sets 11 and 12 can be connected. Each subscriber set 11 and 12 is connected to concentrator/expandor 10 by a respective one of tip conductors 13 and 14 and a respective one of ring conductors 15 and 16. Concentrator/expandor 10 includes a tip network 17 to which tip conductors 13 and 14 are connected and a ring network 18 to which ring conductors 15 and 16 are connected. Tip network 17 and ring network 18 could be combined into the same network, however, they have been shown separately in the present embodiment for ease of understanding. Further, since both the tip network 17 and ring network 18 are substantially identical, only the tip network is shown and described in detail.

Concentrator/expandor 10 can bidirectionally connect up to 64 subscriber sets, e.g., 11 and 12 to 64 channel circuits such as channel circuits 19 and 20. Accordingly, concentrator/expandor 10 has an 8-to-1 concentration (expansion) ratio. Tip network 17 includes three switching stages, each comprising switch modules, e.g., switch module 101, having 32 input terminals and 16 output terminals. The first switching stage comprises 16 switch modules 101 through 116 to accommodate 512 subscriber set connections. The second stage comprises eight switch modules 201 through 208 to connect to the 256 output terminals of the first stage. The third stage comprises four switch modules 301 through 304 to selectively connect the 128 second stage output terminals to the 64 channel circuits, e.g., 19 and 20. Channel circuits 19 and 20 are connected to the output terminals of tip network 17 and ring network 18 by a channel circuit access network 57. Channel circuit access network 57 is controlled to selectively disconnect channel circuits 19 and 20 from the output terminals of tip network 17 and ring network 18 when the continued connection of such channel circuits could distort test results or subject the channel circuit to unnecessary high level signals.

Each switch module comprises a 32 by 16 matrix of crosspoints. In order to connect a given subscriber set to a given channel circuit, one selected crosspoint in each switch stage must be controlled to be conductive. The individual crosspoints of the present embodiment are controlled by a concentrator controller 45. Concentrator controller 45 operates in response to commands from a control unit (not shown) to apply control signals to a plurality of control conductors 56, one of which controls each crosspoint. A more detailed description of the control signals is given later herein. Further, the interaction of concentrator controller 45 and a control unit can be found in the above-mentioned Hafer et al. patent. Since one crosspoint in each switching stage is closed to provide a path through the concentrator/expandor 10, the signals on a given tip conductor, e.g. 13, will pass through three crosspoints between a subscriber set and the output terminals of a given third stage switch module. Since the construction of ring network 18 is substantially identical to tip network 17, signals from a given subscriber set on the ring conductor, e.g., 15 also pass through three crosspoints between the subscriber set and the output terminals of the third stage switch module.

Frequently, subscriber loops are tested to determine their electrical characteristics. Such tests include a line leakage test, which measures the resistance between tip and ring conductors, and ringer check which measures impedance of the subscriber set ringing circuit. In the present embodiment, test signals which are generated and interpreted in a test circuit 23 are applied between the tip and ring conductors of a subscriber set through concentrator/expandor 10. A tip access circuit 21 which consists of a 2 by 64 matrix of crosspoints provides selective connection between the test circuit 23 and the tip network output terminals, e.g., 49 and 53. A ring access circuit 22 also comprises a 2 by 64 matrix of crosspoints to provide selective connection between test circuit 23 and the ring network output terminals. One crosspoint of tip access circuit 21 must be closed to connect each tip network 17 output terminal to test circuit 23. Similarly, one crosspoint of ring access circuit 22 must be closed to connect each ring network 18 output terminal to test circuit 23. Thus, four conduction crosspoints exist in each completed path between each of the subscriber loop conductors and test circuit 23. The crosspoints of tip access circuit 21 and ring access circuit 22 are controlled by concentrator controller 45.

Figure 2:
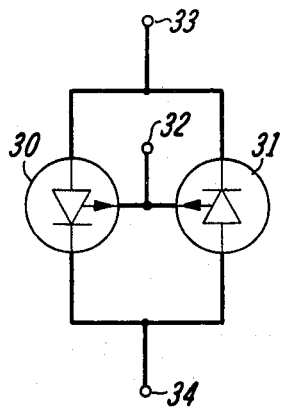
FIG. 2 is a symbolic representation of a semiconductor crosspoint used in the embodiment of FIG. 1.

FIG. 2 is a symbolic representation of the crosspoints utilized in the present embodiment. Each crosspoint comprises two gated diode switches (GDS) of the type described in detail in A. R. Hartman et al., application Ser. No. 248,192, filed Mar. 27, 1981, abandoned. Each gated diode switch has an anode, cathode and a gate electrode and is normally conductive from anode to cathode until the voltage applied to the gate lead exceeds by a predetermined amount the higher of the voltages applied to the anode or the cathode. A voltage which exceeds the anode or cathode voltage by 30 to 40 volts is adequate to make the gated diode switch nonconductive. The crosspoint shown in FIG. 2 comprises gated diode switches 30 and 31 which have their gate electrodes connected together at a terminal 32. The anode of gated diode switch 30 is connected to the cathode of gated diode switch 31 at a terminal 33, and the anode of gated diode switch 31 is connected to the cathode of gated diode switch 30 at a terminal 34. The main conduction path of the crosspoint is between terminals 33 and 34 and is bidirectional. When the voltage applied to the gate terminal 32 exceeds the above-mentioned predetermined amount, the crosspoint is relatively nonconductive (off-state) in both directions. Bidirectional conduction exists when the voltage at terminal 32 is less than the predetermined amount (on-state).

Figure 3:
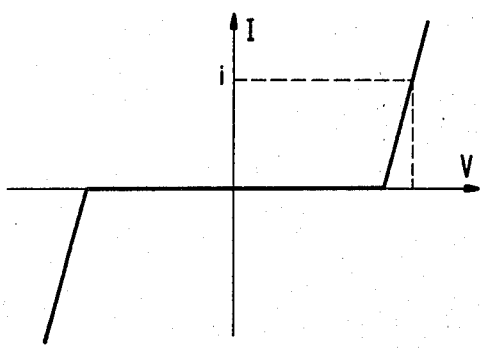
FIG. 3 is a characteristic curve for the crosspoint shown in FIG. 2.

When conducting, a gated diode switch exhibits a voltage drop of approximately 2 volts between its anode and cathode. The actual voltage drop varies based on the particular device, the voltage applied and the current applied. However, for the present example, a 2-volt voltage drop between anode and cathode is assumed. FIG. 3 is a voltage-current plot of a crosspoint of the type shown in FIG. 2 in the on-state.

Figure 4:
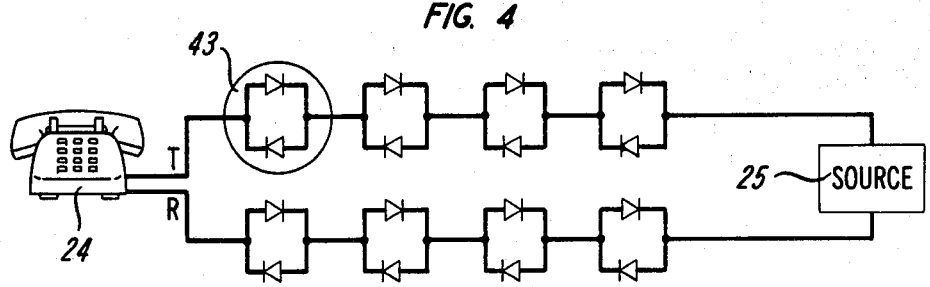
FIGS. 4 and 5 are symbolic representations of communication paths established through the embodiment of FIG. 1.

FIG. 4 is a symbolic representation of a communication path established between a subscriber set 24 and a signal source 25 through four network stages. Both the tip and ring communication paths include four gated diode switch crosspoints 43, each of which is shown as a pair of oppositely connected diodes. This representation is used since a gated diode switch crosspoint in the on-state has similar characteristics to two oppositely connected diodes. When a signal is applied by signal source 25 to the subscriber set 24, it passes through eight gated diode switch crosspoints and the subscriber set before returning to the source. As discussed above, each gated diode switch crosspoint exhibits a voltage drop of 2 volts giving a combined voltage drop of 16 volts for the eight gated diode switch crosspoints. This voltage drop requires that large (in excess of 16 volts) signals must be transmitted through the network, and that any AC signals transmitted will be distorted at a point centering around zero volts.

The embodiment of FIG. 1 provides an arrangement for linearizing the conduction characteristics of a communication path of the type shown in FIG. 4. The connection between test circuit 23 and the tip access circuit 21 includes a linearizing source 26 (FIG. 1). Linearizing source 26 comprises a DC voltage source 27, the negative terminal of which is connected to the positive terminal of a voltage source 28 and to a conductor 38 which is connected to test circuit 23. The positive terminal of voltage source 27 is connected through a resistor 29 to a conductor 35. Similarly, the negative terminal of voltage source 28 is connected through a resistor 36 to a conductor 37. Conductors 35 and 37 are each connected to tip access circuit 21 which can selectively connect conductors 35 and 37 to any of the output terminals of tip network 17. Since the crosspoints of the present embodiment provide bidirectional communication, both voltage sources 27 and 28 could be reversed to achieve the same results. Regardless of their orientation, the voltage sources 27 and 28 should, however, be connected in a series-aiding relationship. The connection between test circuit 23 and the ring access circuit 22 includes a similar linearizing source 39. Linearizing source 39 includes two voltage sources and two resistors which are connected in a manner substantially identical to the voltage sources and resistors of linearizing source 26. Additionally, test circuit 23 is connected to linearizing source 39 via a conductor 40 and linearizing source 39 is connected to ring access circuit 22 via two conductors 41 and 42. Conductors 41 and 42 can be selectively connected to any of the output terminals of ring network 18 by ring access circuit 22.

When a test is to be applied to a given subscriber loop, for example the loop consisting of conductors 13 and 15 and subscriber set 11, two communication paths are established through the concentrator/expandor 10 between the tip conductor 13 of the subscriber loop under test to two selected output terminals, e.g., 49 and 53 of the third tip network stage. These paths are shown as heavy lines in FIG. 1, with conducting crosspoints of the paths being represented as a ⊗.

The first communication path extends from tip conductor 13 through crosspoints 46, 47 and 48 to tip network output terminal 49. The second communication path extends from tip conductor 13 through crosspoints 50, 51 and 52 to tip network output terminal 53. Additionally, a crosspoint 54 of tip access circuit 21 is controlled to connect tip network output terminal 49 to conductor 35, and a crosspoint 55 is controlled to connect tip network output terminal 53, to conductor 37. A similar pair of communication paths is established through ring network 18 and ring access circuit 22 between ring conductor 15 of the loop under test and conductors 41 and 42.

Figure 5:
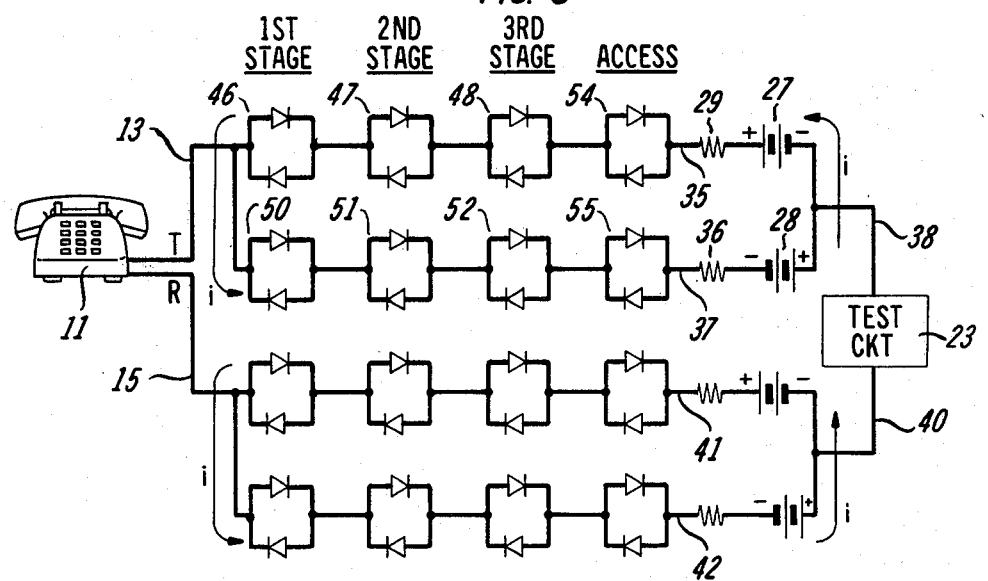

A symbolic representation of the communication paths established between test circuit 23 and the subscriber set 11 is shown in FIG. 5. The two tip network paths to tip conductor 13 and the connection of voltage sources 27 and 28 forms a complete circuit around which current i will flow. The current i is used to linearize the crosspoints without otherwise affecting the communication path.

Voltage sources 27 and 28 should be chosen to be equal and to have a total voltage slightly greater than the sum of the voltage drops of all eight gated diode switch crosspoints around the completed circuit. Since the sum of voltage drops around the completed circuit is 16 volts, each voltage source 27 and 28 can supply, for example, 9 volts. The amount of current i flowing around the completed circuit should be sufficient to maintain the crosspoints in a substantially linear region over the full range of signals to be transmitted to the subscriber loop (see FIG. 3). In the present example, a 10 milliamp circulating current i has been found to be sufficient. Since 10 milliamps provides a sufficiently linear crosspoint at 2 volts, resistances 29 and 36 should be chosen to drop approximately 1 volt each at 10 milliamps. Accordingly, in the present example, resistance 29 and 36 should each equal 100 ohms. When the DC resistance of the crosspoints is significant, this resistance should be considered when selecting the value for resistors 29 and 36. For example, when each crosspoint has a resistance of 10 ohms, the total crosspoint resistance is equal to 80 ohms. In order to maintain 200 ohms around the completed circuit, each resistor 29 and 36 would have to have a resistance of 60 ohms. Similar voltage sources and resistances are used to linearize the ring conductor communication paths.

When voltage sources 27 and 28 are equal, the voltage applied by these sources to conductor 38 will be substantially identical to the voltage applied to the loop conductor 13. In situations where the voltages at conductor 38 and loop conductor 13 need not be the same, voltage sources 27 and 28 can differ, provided the sum of the voltages applied is slightly greater than the sum of the crosspoint voltage drops around the loop. In fact, a single voltage supply, e.g., voltage supply 27 can be used in such a situation provided that voltage supply 28 is replaced with a short circuit.

When the linearizing arrangement as above described, is connected through the concentrator, test signals are applied between conductors 38 and 40 by test circuit 23. The conduction characteristics of the subscriber loop are then checked without distortion from the concentrator crosspoints. For example, test circuit 23 can apply a 5-volt, 20-hertz signal between conductors 38 and 40 to check the ringer of a given subscriber set. By measuring the magnitude and phase angle of the current on conductor 38 or conductor 40, test circuit 23 can determine the impedance of the given subscriber set ringer.

The preceding description is related to a subscriber loop test arrangement which utilized a concentrator/expandor 10 as the subscriber loop selector. The use of other types of networks and the transmission and reception of other types of signals are clearly within the scope of the present invention. Further, the prior description related to networks using gated diode switch crosspoints. The present invention clearly applies equally well to other types of nonlinear crosspoints, such as crosspoints made from two PNPN devices connected in antiparallel.

It is to be understood that the above-described embodiments are merely illustrative of the principles of the invention and that other arrangements may be devised by those skilled in the art without departing from the spirit and scope of the invention.

What is claimed is:

1. A switching network having input ports and output ports, said switching network comprising:
   a plurality of crosspoints, each of said crosspoints having relatively nonlinear conduction characteristics when conducting a current less than a predetermined current and having relatively linear conduction characteristics when conducting a current in excess of said predetermined current;
   control means for controlling the crosspoints of said switching network to establish separate conduction paths between a first one of said input ports and a first selected pair of said output ports; and
   linearizing means connected to said first selected output ports for transmitting a current in excess of said predetermined current from one of said first selected output ports to the other of said first selected output ports;
   wherein said linearizing means comprises a DC voltage supply connected in series with a resistance between said one of said first selected output ports and said other of said first selected output ports.

2. The switching network in accordance with claim 1 further comprising signaling means for applying signals to said first selected output ports.

3. The switching network in accordance with claim 1 wherein said control means further comprises means for controlling the crosspoints of said switching network to establish separate conduction paths between a second one of said input ports and a second selected pair of said output ports; and
   wherein said linearizing means further comprises means connected to said second selected output ports for transmitting a current in excess of said predetermined current from one of said second selected output ports to the other of said second selected output ports comprising a DC voltage supply connected in series with a resistance between said one of said second selected output ports and said other of said second selected output ports.

4. The switching network in accordance with claim 3 further comprising signaling means for applying signals between said first selected output ports and said second selected output ports.

5. A switching network having input ports and output ports, said switching network comprising:
   a plurality of crosspoints, each of said crosspoints having relatively nonlinear conduction characteristics when conducting a current less than a predetermined current and having relatively linear conduction characteristics when conducting a current in excess of said predetermined current;

control means for controlling the crosspoints of said switching network to establish separate conduction paths between a first one of said input ports and a first selected pair of said output ports; and linearizing means connected to said first selected output ports for transmitting a current in excess of said predetermined current from one of said first selected output ports to the other of said first selected output ports;

wherein said linearizing means comprises a first DC voltage supply portion comprising a first DC voltage source and a serially connected first resistance and a second DC voltage supply portion comprising a second DC voltage source and a serially connected second resistance, and means for connecting said first DC voltage supply portion and said second DC voltage supply portion in a series-aiding relationship between said first selected output ports; and wherein said switching network further comprises signaling means connected to the common point between said first and said second DC voltage supply portions for applying signals to said first selected output ports.

6. The switching network in accordance with claim 5 wherein said first and said second DC voltage sources have substantially equal output voltages and said first and said second resistances are substantially equal.

7. The switching network in accordance with claim 1, 5, or 6 wherein each of said plurality of crosspoints comprises a pair of gated diode switches connected in antiparallel.

8. An arrangement for testing telephone subscriber loop circuits comprising:

a switching network comprising input ports, output ports, and a plurality of crosspoints each of said crosspoints having relatively nonlinear conduction characteristics when conducting a current less than a predetermined current and having relatively linear conduction characteristics when conducting a current in excess of said predetermined current;

means connecting one of said subscriber loop circuits to a first one of said input ports and a second one of said input ports;

control means for controlling the crosspoints of said switching network to establish separate conduction paths between said first input port and a first selected pair of said output ports and to establish separate conduction paths between said second input port and a second selected pair of said output ports;

linearizing means connected to said first selected output ports for transmitting a current in excess of said predetermined current from one of said first selected output ports to the other of said first selected output ports and connected to said second selected output ports for transmitting a current in excess of said predetermined current from one of said second selected output ports to the other of said second selected output ports; and signaling means for applying signals between said first selected output ports and said second selected output ports;

wherein said linearizing means comprises a DC voltage supply connected in series with a resistance between said one of said first selected output ports and said other of said first selected output ports and a DC voltage supply connected in series with a resistance between said one of said second selected output ports and said other of said second selected output ports.

9. An arrangement for testing telephone subscriber loop circuits comprising:

a switching network comprising input ports, output ports, and a plurality of crosspoints each of said crosspoints having relatively nonlinear conduction characteristics when conducting a current less than a predetermined current and having relatively linear conduction characteristics when conducting a current in excess of said predetermined current;

means connecting one of said subscriber loop circuits to a first one of said input ports and a second one of said input ports;

control means for controlling the crosspoints of said switching network to establish separate conduction paths between said first input port and a first selected pair of said output ports and to establish separate conduction paths between said second input port and a second selected pair of said output ports; and linearizing means connected to said first selected output ports for transmitting a current in excess of said predetermined current from one of said first selected output ports to the other of said first selected output ports and connected to said second selected output ports for transmitting a current in excess of said predetermined current from one of said second selected output ports to the other of said second selected output ports;

wherein said linearizing means comprises a first DC voltage supply portion comprising a first DC voltage source and a serially connected first resistance and a second DC voltage supply portion comprising a second DC voltage source and a serially connected second resistance; means for connecting said first DC voltage supply portion and said second DC voltage supply portion in a series-aiding relationship between said first selected output ports; a third DC voltage supply portion comprising a third DC voltage source and a serially connected third resistance and a fourth DC voltage supply portion comprising a fourth DC voltage source and a serially connected fourth resistance; and means for connecting said third DC voltage supply portion and said fourth DC voltage supply portion in a series-aiding relationship between said second selected output ports; and wherein said arrangement further comprises signaling means connected to the common point between said first DC voltage supply portion and said second DC voltage supply portion and to the common point between said third DC voltage supply portion and said fourth DC voltage supply portion for applying signals between said first selected output ports and said second selected output ports.

10. The arrangement in accordance with claim 9 wherein said first and said second DC voltage sources have substantially equal output voltages and said first and said second resistances are substantially equal; and said third and said fourth DC voltage sources have substantially equal output voltages and said third and said fourth resistances are substantially equal.

11. The arrangement in accordance with claim 8, 9, or 10 wherein each of said plurality of crosspoints comprises a pair of gated diode switches connected in antiparallel.

12. A switching network having input ports and output ports, said switching network comprising:
   a plurality of crosspoints, each of said crosspoints having relatively nonlinear conduction characteristics when conducting a current less than a predetermined current and having relatively linear conduction characteristics when conducting a current in excess of said predetermined current;
   control means for controlling the crosspoints of said switching network to establish separate conduction paths between a first one of said input ports and a first selected pair of said output ports and to establish separate conduction paths between a second one of said input ports and a second selected pair of said output ports; and
   linearizing means connected to said first selected output ports for transmitting a current in excess of said predetermined current from one of said first selected output ports to the other of said first selected output ports and connected to said second selected output ports for transmitting a current in excess of said predetermined current from one of said second selected output ports to the other of said second selected output ports;
   wherein said linearizing means comprises a first DC voltage supply portion comprising a first DC voltage source and a serially connected first resistance and a second DC voltage supply portion comprising a second DC voltage source and a serially connected second resistance; means for connecting said first DC voltage supply portion and said second DC voltage supply portion in a series-aiding relationship between said first selected output ports; a third DC voltage supply portion comprising a third DC voltage source and a serially connected third resistance and a fourth DC voltage supply portion comprising a fourth DC voltage source and a serially connected fourth resistance; and means for connecting said third DC voltage supply portion and said fourth DC voltage supply portion in a series-aiding relationship between said second selected output ports; and wherein
   said switching network further comprises signaling means connected to the common point between said first DC voltage supply portion and said second DC voltage supply portion and to the common point between said third DC voltage supply portion and said fourth DC voltage supply portion for applying signals between said first selected output ports and said second selected output ports.

13. The switching network in accordance with claim 12 wherein said first and said second DC voltage sources have substantially equal output voltages and said first and said second resistances are substantially equal; and
   said third and said fourth DC voltage sources have substantially equal output voltages and said third and said fourth resistances are substantially equal.

* * * * *